United States Patent [19]

Clutter

[11] 4,234,753
[45] Nov. 18, 1980

[54] ELECTRICAL INSULATOR AND CONDUCTOR COVER

[75] Inventor: Melvin E. Clutter, Centralia, Mo.

[73] Assignee: A. B. Chance Company, Centralia, Mo.

[21] Appl. No.: 40,129

[22] Filed: May 18, 1979

[51] Int. Cl.³ .............................................. H01B 17/58
[52] U.S. Cl. ..................................... 174/5 R; 174/136
[58] Field of Search ................................ 174/5 R, 136

[56] References Cited

U.S. PATENT DOCUMENTS

| D. 240,833 | 8/1976 | Clutter et al. | 174/5 R X |
| 964,969 | 7/1910 | Hesterhagen | 174/5 R X |
| 1,836,572 | 12/1931 | Briney | 174/5 R |
| 2,927,146 | 3/1960 | Salisbury | 174/5 R |
| 3,459,870 | 8/1969 | Plummer | 174/5 R |
| 3,835,238 | 9/1974 | West | 174/5 R |
| 3,900,697 | 8/1975 | Yotsugi | 174/5 R |

FOREIGN PATENT DOCUMENTS 505013 5/1939 United Kingdom .................. 174/5 R Primary Examiner—Laramie E. Askin
Attorney, Agent, or Firm—Schmidt, Johnson, Hovey & Williams

[57] ABSTRACT

An improved electrical conductor cover is provided which essentially completely surrounds an energized conductor and is resistant to inadvertent, impact-induced dislocation of the cover during use. The cover includes an elongated, tubular, conductor-receiving section and a pair of ribbed, normally biased-together legs extending from the section. The legs normally are in abutting engagement, but can be separated for positioning the cover on a conductor; the ribs are spaced along the length of the legs and serve to cooperatively maintain the conductor within the tubular section even in the event of an accidental impact normally tending to spread the legs and thus expose the covered conductor. The cover also includes a molded-in-place, threaded head which projects only through the outer surface of the cover for allowing connection of a manipulative handle to the cover without the need for rivets or the like which extend completely through the insulative wall of the cover.

5 Claims, 6 Drawing Figures

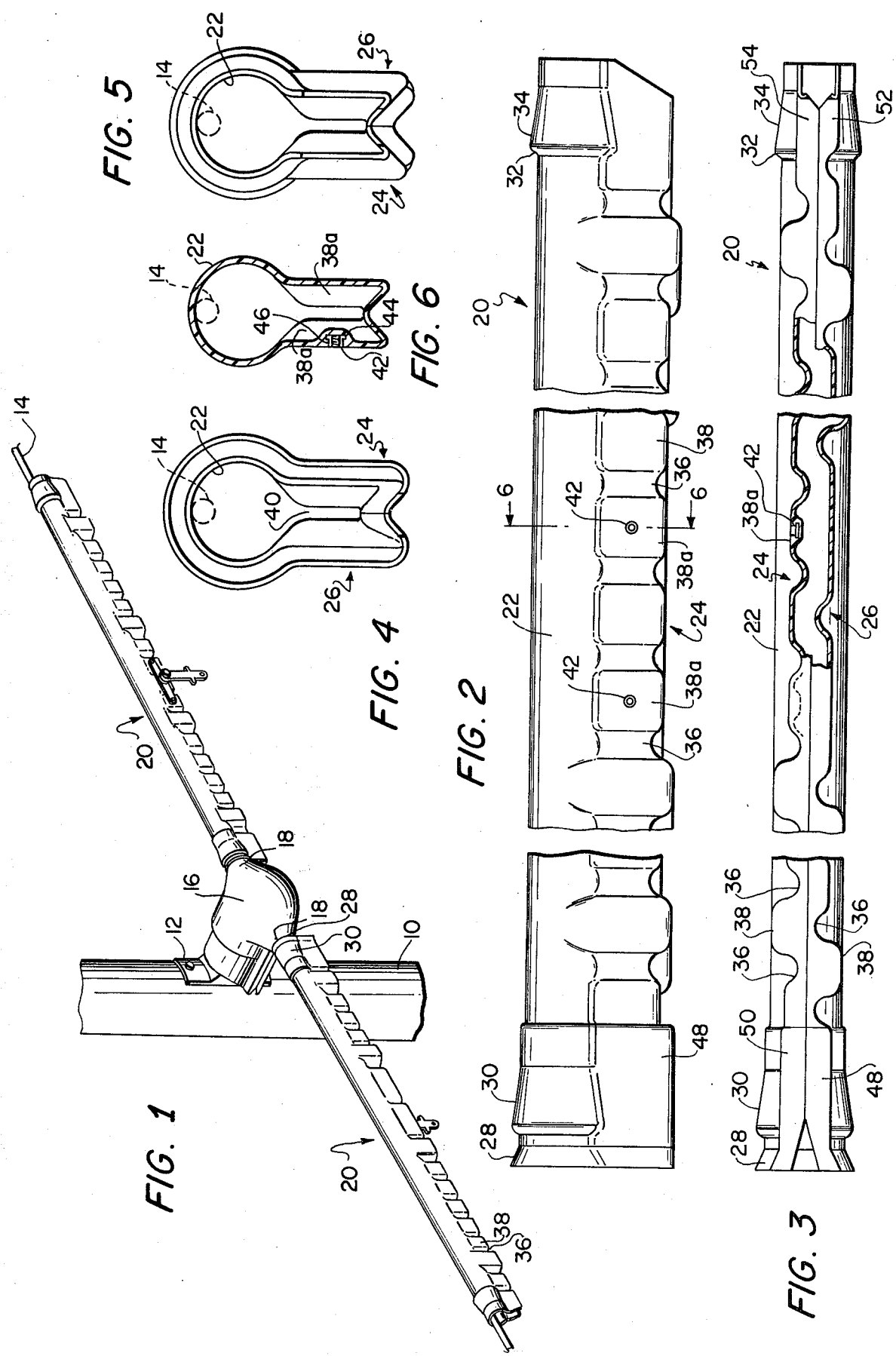

ELECTRICAL INSULATOR AND CONDUCTOR COVER

BACKGROUND OF THE INVENTION

1. Field of the Invention

The present invention is concerned with electrical cover-up equipment used by linemen to temporarily cover energized lines and/or equipment. More particularly, it is concerned with improved covers of this type which provide a safe, virtually complete cover for an energized conductor and are resistant to impact-induced dislocation. The covers of the invention are further characterized by provision of threaded inserts molded therein which extend only through the outer surface of the cover, to thereby further enhance the insulative function thereof.

2. Description of the Prior Art

Specialized temporary cover-up devices for use by linemen when working in the proximity of energized electrical equipment are common. A number of patents describe particular types of such equipment, including U.S. Pat. Nos. 3,835,238, 2,927,146 and 3,922,476.

A primary concern in connection with insulative cover-up equipment is that it surround, as completely as possible, the equipment in question. Furthermore, in order to maximize the safety aspect, the equipment should be resistant to accidental dislodgement or removal thereof from the equipment being covered. That is to say, a lineman working in the vicinity of temporarily covered, energized electrical equipment must be safe from the hazards of electrical shock even if the cover should be accidentally touched or jostled.

In many types of insulative covers it is a common practice to provide manipulative handles secured to the cover to facilitate positioning thereof on a line or other equipment. The practice in the past has been to secure the manipulative handle by means of metallic rivets or threaded members which extend completely through the insulative wall of the cover. Although such rivets are normally placed as far as possible from the energized electrical equipment being covered, the danger nonetheless remains that such metallic members will accidentally come into contact with the electrical equipment.

SUMMARY OF THE INVENTION

The present invention provides an improved insulative cover which overcomes all of the problems noted above. For example, a conductor cover in accordance with the invention comprises an elongated, open-ended member, formed of resilient, electrically insulative material. The member is configured to present a tubular, conductor-receiving section, and a pair of side-by-side closure legs which are normally biased together in abutting contact, when the cover is in use. In this manner the conductor is substantially completely surrounded by the insulative material.

The conductor cover legs are further configured to present a series of alternating ribs along the length thereof which cooperatively serve to maintain the conductor in spaced relationship to the outermost margin of the legs remote from the tubular section. Thus in the event that the conductor is subjected to an impact which would normally tend to spread the legs and thus expose the conductor, the ribs serve to resist this untoward and dangerous result.

The covers of the invention are also improved by provision of a threaded member for connection of a handle to the cover, wherein the threaded member is molded in place in the cover itself and extends only through the outer surface of the latter remote from the equipment being covered. The electrical integrity of the cover is therefore enhanced by complete elimination of metallic rivets or the like which extend completely through the cover wall.

BRIEF DESCRIPTION OF THE DRAWING

FIG. 1 is a perspective view illustrating cover-up equipment in accordance with the invention operatively disposed over a horizontally extending insulator and a section of conductor adjacent the insulator;

FIG. 2 is a fragmentary side elevational view illustrating the construction of one of the conductor covers;

FIG. 3 is a fragmentary bottom plan view with parts broken away for clarity and parts shown in phantom which further illustrates the cover depicted in FIG. 2;

FIG. 4 is an end elevational view of the left hand end of the cover depicted in FIG. 2;

FIG. 5 is an end elevational view of the opposite end of the cover depicted in FIG. 2; and FIG. 6 is a sectional view taken along line 6—6 of FIG. 2 which illustrates the threaded, molded-in-place handle connector forming a part of the cover.

DESCRIPTION OF THE PREFERRED EMBODIMENT

Turning now to the drawing, FIG. 1 illustrates a typical situation where cover-up equipment of the present invention can be used. Specifically, an upright utility pole 10 is illustrated having an insulator mounting bracket 12 secured thereto, with a conventional insulator (not shown) extending laterally outwardly from the bracket 12. The insulator supports an elongated, energized conductor 14 in the usual fashion. When it is desired to work in the vicinity of the conductor 14 and supporting insulator, considerations of safety dictate that the components be temporarily covered. In the situation illustrated in FIG. 1, an insulator cover 16 is employed which is generally T-shaped in configuration and includes respective, oppositely outwardly extending, tubular portions 18 for receiving the conductor 14. Respective, identical conductor covers 20 are disposed on opposite sides of the cover 16 and safely cover corresponding stretches of the conductor 14. Inasmuch as the conductor covers 20 are identical, only one need be described in detail herein.

Turning now to FIGS. 2-6, it will be seen that the cover 20 is an integral number formed of a conventional, yieldable, electrically insulative, synthetic resin material. The cover broadly includes an elongated, tubular section 22 and a pair of side-by-side cooperating legs 24 and 26 which extend from the section 22.

The section 22 is adapted to receive the conductor 14 as best seen in FIGS. 4-6, and it is noted in this respect that a substantial air gap is provided between the conductor 14 and the upper margins of the respective legs 24, 26. In addition, each end of the section 22 is provided with conventional, outwardly flaring, frustoconical segments 28, 30, 32 and 34. The frustoconical segments allow snap-fit interconnection of a number of covers 20 in an end-to-end relationship, so as to safely cover as long a stretch of conductor as required. It will also be recognized from a study of FIG. 1 that the frustoconical sections are designed so as to permit a snap-fit interconnection between the covers 20 and the tubular portions 18 of the insulator cover 16.

The legs 24, 26 extend a substantial distance along the length of the cover 20 and are designed to abut along this length. Moreover, the legs are biased together by virtue of the yieldability of the synthetic resin material employed, but can be separated as desired to allow positioning of the cover over a stretch of conductor. After such initial positioning however, it will be recognized that the tubular section 22 and the biased-together legs 24, 26 cooperate and completely surround the conductor 14.

Each leg 24, 26, is provided with a series of projecting ribs 36 and 38. For purposes of convenience in discussion, the ribs 36 will be referred to as extending inwardly, whereas the ribs 38 will be referred to as extending outwardly. As best seen in FIGS. 1 and 2, the ribs 36, 38 along the length of the cover 20, and a pair of somewhat wider, outwardly extending ribs 38a are provided at the central area of the cover. Furthermore, referring to FIG. 3, it will be seen that the ribs 36 of a given leg are in a side-by-side relationship with the ribs 38 of the opposite leg. In this manner a constant spacing between ribs in the respective legs is achieved, notwithstanding the undulating configuration of the ribbed legs 24, 26.

As best seen in FIGS. 4-6, the minimum spacing cooperatively defined between the alternating ribs 36, 38 (i.e., referred to by the numeral 40) is preferably in its transverse dimension less than the diameter of the conductor 14. Thus, in the event that a lineman inadvertently displaces cover 20 upwardly, the cooperating ribs 36, 38 engage the conductor 14 and serve to maintain the latter in a safe, remote position relative to the outermost margins of the legs remote from the tubular section 22.

An annular threaded insert 42 is molded into the respective ribs 38a. As best seen in FIG. 6, the insert 42 includes a flanged head 44, and an internally threaded, cylindrical portion 46. Furthermore, each insert 42 is molded into a corresponding rib 38a in a manner such that the insert projects only through the outermost surface of the cover 20, there being no metallic portion extending through the defining wall of the cover.

It will also be seen that the endmost portions of the tubular section 22 include respective, normally biased together, pairs of planar legs 48, 50 and 52, 54. These planar legs merge into the respective legs 24, 26, and in effect form a continuation thereof. As can be appreciated, this further serves to enhance the protective function of the cover, inasmuch as the endmost legs 48, 50 and 52, 54 are likewise biased together and abuttably engaged during use of the cover 20.

It is also significant that the configuration of cover 20 is eminently suited for fabrication using rotational molding techniques. Heretofore, many covers of this type have been made by vacuum molding but it is extremely difficult to form a conductor cover which fully surrounds an energized line using this method.

During rotational molding, the open end of the insert 42 is attached temporarily to the inner mold wall, and the synthetic resin molding material flows around and bonds to the exposed surfaces of the insert without filling the threaded section thereof. The preferred flanged construction of the insert 42 also facilitates this molding in place and ensures that the insert will remain firmly embedded within the cover wall.

Having thus described the invention, what is claimed as new and desired to be secured by Letters Patent is:

1. An electrical conductor cover comprising:
    an elongated, open-ended member formed of resilient, electrically insulative material,
    said member being configured to present an upper tubular, conductor-receiving section, and a pair of elongated, depending, side-by-side, laterally spaced closure legs extending from the tubular section,
    said legs normally biased together in abutting contact with each other to present a central line of juncture therebetween, when the cover is in use with a conductor received within said tubular section, for substantially completely surrounding the conductor, said legs being selectively separable for permitting positioning of a conductor within the tubular section,
    each of said legs being configured to present a series of inwardly extending, upright, elongated ribs for cooperatively maintaining said conductor in spaced relationship to the outermost margin of the legs remote from the tubular section, in the event that the cover, when in use, is subjected to an impact normally tending to spread said legs and thus expose said conductor, the innermost surfaces presented by the series of ribs on each leg being disposed such that an upright imaginary plane between said legs and coincident with said line of juncture passes uninterruptedly along the length of said cover between the separate series of ribs.

2. The electrical conductor cover of claim 1 wherein the respective ends of said tubular section are configured to present frustoconical portions for end-to-end interfitting of a number of said covers on a length of conductor.

3. The electrical conductor cover of claim 1 including a metallic threaded insert molded into said member and projecting only through the outer surface thereof remote from the conductor-receiving space defined by said tubular section.

4. The electrical conductor cover of claim 1 wherein the ribs of one leg are longitudinally offset from the ribs on the other leg.

5. The electrical conductor cover of claim 1 wherein said ribs cooperatively define therebetween an elongated rectilinear passage, the transverse diameter of said passage being less than the diameter of a conductor to which the cover is to be applied.

* * * * *